Figure 4:
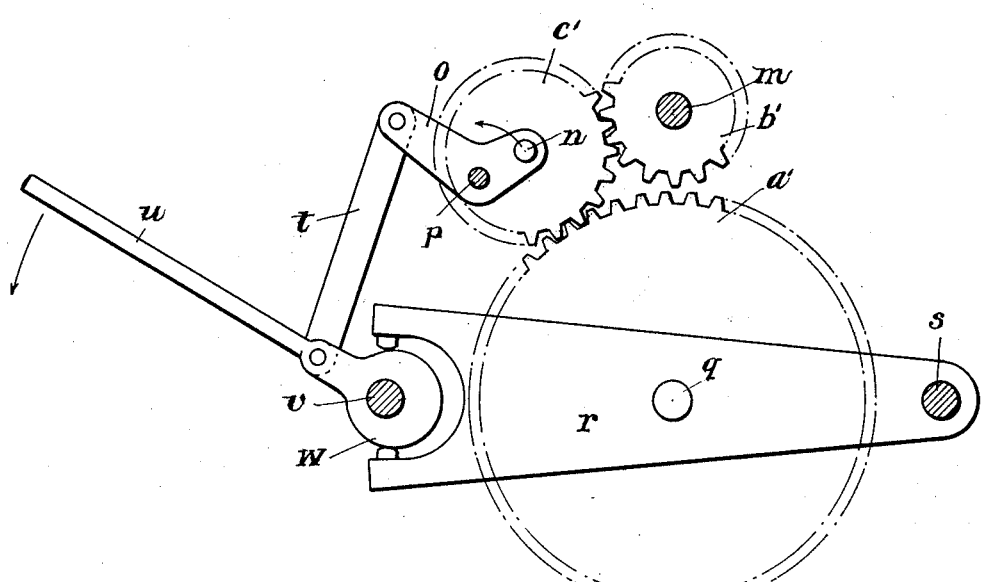

B. LJUNGSTRÖM.
SPIRAL CUT GEAR WHEEL.
APPLICATION FILED MAR. 7, 1919.
1,343,923. Patented June 22, 1920.
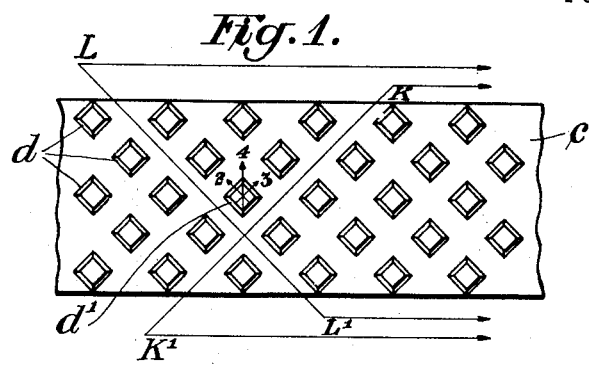
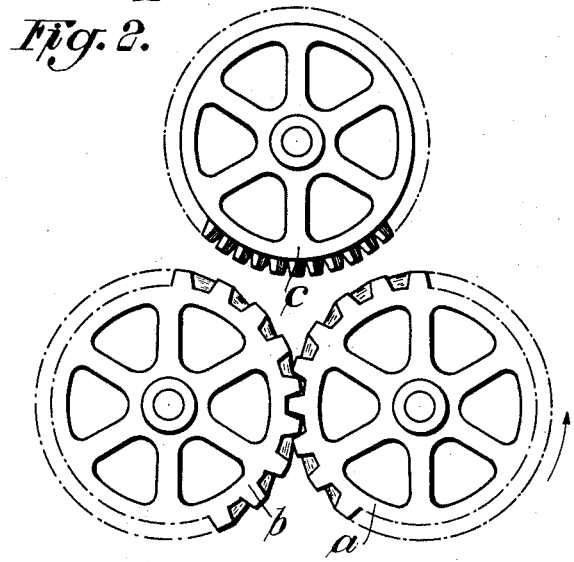
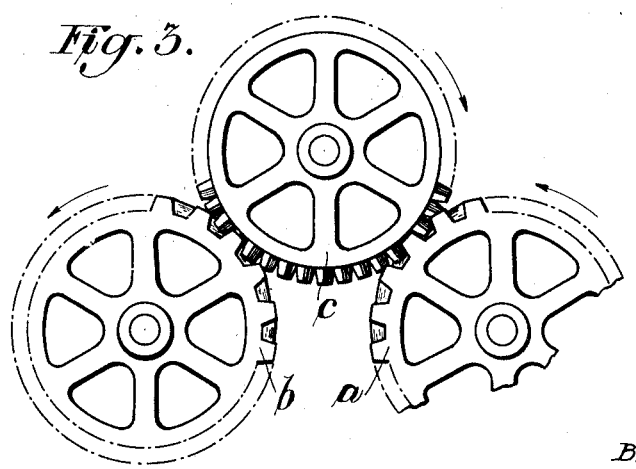
Inventor
B. Ljungström.
By H. R. Kerslake
Atty.

UNITED STATES PATENT OFFICE.

BIRGER LJUNGSTRÖM, OF STOCKHOLM, SWEDEN, ASSIGNOR TO AKTIEBOLAGET LJUNGSTRÖMS ÅNGTURBIN, OF LIDINGÖ-BREVIK, SWEDEN.

SPIRAL-CUT GEAR-WHEEL.

1,343,923.          Specification of Letters Patent.     Patented June 22, 1920.

Application filed March 7, 1919. Serial No. 281,280.

*To all whom it may concern:*

Be it known that I, BIRGER LJUNGSTRÖM, subject of the King of Sweden, residing at Stockholm, Sweden, have invented certain new and useful Improvements in Spiral-Cut Gear-Wheels, of which the following is a specification.

Where it is desirable to reverse the direction of rotation of gear wheels by means of an intermediate wheel brought in engagement with the first-mentioned wheels, or where a toothed wheel is to be brought in mesh alternately with two wheels rotating in opposite directions, it is impossible to make use of spiral cut gear wheels, unless for the said purpose a further intermediate gear cut in the opposite direction is inserted beside one of the wheels already existent. Apart from all regard to the necessity of inserting an additional intermediate wheel, the drawback is met with, that the one or both of the gear wheels are alternately subjected to pitch-line pressure on both sides of the same tooth, the teeth being thus prevented from accommodating themselves to each other to attain a uniform pitch-line pressure and a smooth run.

The present invention relates to an arrangement in spiral cut gear wheels wherein only one intermediate wheel has to be thrown in mesh, which wheel may engage with any wheel provided with teeth cut to the same inclination, the said intermediate wheel being furthermore capable of accommodating itself to the others to attain a uniform pitch-line pressure and a smooth run.

The invention consists therein that the spiral cut gear wheel or intermediate wheel is provided with oblique teeth of two inclinations, i. e. running obliquely from the right to the left and from the left to the right, whereby tooth spaces are produced, which spaces cross each other and thus call for only one intermediate wheel to be used for the transmission of power between two other gear wheels provided with helical teeth engaging each other, the cross cut wheel, furthermore, offering possibilities for a relative accommodation of all of the three gear wheels. The cross cut intermediate gear wheel preferably should be cut rectangularly or nearly so, and the other wheels consequently at angles of 45°, in order to prevent the teeth from being alternately influenced by forces acting partly in opposite directions.

In the accompanying drawing Figure 1 illustrates the teeth of an intermediate gear wheel devised according to the invention, the same being developed in the plan. Figs. 2 and 3 show the application of such intermediate gear. Fig. 4 is an elevational detail of the means for shifting the gears.

Figs. 2 and 3 indicate how an intermediate gear according to the invention may be employed to effect a reversal of the rotation. Assuming $a$ to be the driving gear rotating in the direction of the arrow, while $b$ is the driven gear, then, if the teeth of $a$ are cut obliquely from the left, the teeth $b$ must be cut obliquely from the right. If it is now desired to reverse the direction of rotation of the wheel $b$, the intermediate wheel $c$ is thrown in, Fig. 3 showing the relative positions of the wheels when in engagement with each other. If the wheel $c$ shall fit to the wheel $a$ the teeth of same must be beveled from the right, and if it shall fit the wheel $b$ the teeth of same must be beveled from the left. In an ordinary spiral cut gear wheel this can not be effected unless a further wheel be mounted on at least one of the shafts at $a$, $b$ or $c$ or on a separate shaft, the teeth of the latter wheel then being beveled in the opposite direction to the teeth of the wheel already mounted on the same shaft. If, on the contrary, the intermediate gear $c$ be made according to the present invention, the mounting of an additional wheel is avoided, and the use of spiral cut gear wheels is made possible.

Fig. 1 shows part of the teeth of the gear wheel $c$ developed in the plan. As will be seen from the drawing, this wheel is provided with teeth beveled in both directions, the teeth $d$ provided with running surfaces on all sides being thus obtained.

If, now, the forces acting for instance on the tooth $d'$ be examined, it will be found that the same is acted upon by two forces which may be composed into a resultant. The case according to Fig. 3 being prevalent, i. e. power being transmitted from wheel $a$ to wheel $b$ through the wheel $c$, a tooth of wheel $a$ for instance is situated in the space $L$—$L_1$ between the teeth of wheel $c$. The tooth of wheel $a$ causes a pressure to act on the tooth $d'$ in the direction of the arrow 3. At another instant, a tooth of wheel $b$ for instance is situated in the space $K—K_1$ between the teeth of wheel $c$. This tooth produces a pressure on the tooth $d'$ in the direction of the arrow 2. Assuming these forces to act at the same time they will be composed into a force acting in the direction of the arrow 4 and tending to move the tooth in the direction of said arrow 4. If the teeth of the wheel be cross cut at right angles, this advantage is appreciable in a still higher degree, the tooth being then capable of accommodatitng itself to the teeth of the other wheels also by flexure. In this case the tooth will be stronger, too, the same not being bent to and fro by forces, acting alternately in opposite directions. Thus, a gear wheel according to the present invention is capable of accommodating itself to two other wheels, a more convenient reversing arrangement being attained at the same time.

In Fig. 4 of the drawing there is disclosed for the purpose of illustration only, one form of the means for establishing the two relationships of the gears, broadly by shifting one of the wheels alternately into and mesh and out of operative engagement with the other wheels. In reducing this feature of the invention to practice $c'$, $b'$ and $a'$ represent the three wheels, of which the wheel $c'$ corresponds to wheel $c$ in Figs. 1, 2 and 3. For the sake of clearness the wheels are shown only as common gear wheels.

The wheel $b'$ runs on a fixed motor shaft $m$. The intermediate wheel $b'$ is arranged on a shaft $n$, journaled in the lever $o$, which is turnable on the shaft $p$. The wheel $a'$ is arranged on the shaft $q$, journaled in the frame $r$, which latter is in turn swingable on the shaft $s$.

By means of a link $t$ the lever $o$ is connected to the lever $u$, which is turnable around the fixed shaft $v$ and provided at the point of engagement with the said shaft $v$ with an eccentric portion $w$.

Now when the lever $u$ is turned in the direction of the arrow, the wheels $c'$ and $a'$ are lifted. The wheel $c'$ is, however, lifted more than the wheel $a'$ and when the wheels $b'$ and $a'$ are into operative engagement with each other, the engagement between the wheels $c'$ and $a'$ has ceased. Now the wheel $b'$ will drive the wheel $a'$ directly in the opposite direction.

From the wheel $a'$ the locomotive is driven in any suitable manner.

What I claim as new and desire to secure by Letters Patent of the United States is:—

In a gearing system, the combination of a pair of gears having spiral teeth adapted to mesh with each other in one operative position, and a third gear having cross-cut teeth adapted to mesh with the spiral teeth of said pair of gears in another operative position.

In testimony whereof I affix my signature in presence of two witnesses.

BIRGER LJUNGSTRÖM.

Witnesses:
  P. H. BERGROTH,
  JACOB BAGGO.